(12) United States Patent
Corby et al.

(10) Patent No.: US 7,926,105 B2
(45) Date of Patent: Apr. 12, 2011

(54) USING SECURITY-RELATED ATTRIBUTES

(75) Inventors: Karen Elizabeth Corby, Seattle, WA (US); Mark Alcazar, Seattle, WA (US); Viresh Ramdatmisier, Seattle, WA (US); Ariel Jorge Kirsman, Bellevue, WA (US); Andre A. Needham, Redmond, WA (US); Akhilesh Kaza, Sammamish, WA (US); Raja Krishnaswamy, Redmond, WA (US); Jeff Cooperstein, Bellevue, WA (US); Charles W Kaufman, Sammamish, WA (US); Chris Anderson, Redmond, WA (US); Venkata Rama Prasad Tammana, Kirkland, WA (US); Aaron R Goldfeder, Tampa, FL (US); John Hawkins, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 971 days.

(21) Appl. No.: 11/364,359

(22) Filed: Feb. 28, 2006

(65) Prior Publication Data
US 2007/0209073 A1 Sep. 6, 2007

(51) Int. Cl.
G06F 11/00 (2006.01)
G06F 12/14 (2006.01)
G06F 12/16 (2006.01)
G08B 23/00 (2006.01)

(52) U.S. Cl. ............................ 726/22; 713/152; 709/229

(58) Field of Classification Search .............. 726/22–25; 713/194, 166; 709/229
See application file for complete search history.

(56) References Cited

U.S. PATENT DOCUMENTS

| | | | |
|---|---|---|---|
| 5,857,105 A * | 1/1999 | Ayers et al. .................... | 717/144 |
| 6,088,801 A * | 7/2000 | Grecsek ........................... | 726/1 |
| 6,192,476 B1 * | 2/2001 | Gong ................................ | 726/4 |
| 6,275,938 B1 * | 8/2001 | Bond et al. ...................... | 726/23 |
| 2006/0021029 A1 * | 1/2006 | Brickell et al. ................. | 726/22 |

* cited by examiner

Primary Examiner — Taghi T. Arani
Assistant Examiner — Narciso Victoria
(74) Attorney, Agent, or Firm — Workman Nydegger

(57) ABSTRACT

Described is a technology including an evaluation methodology by which a set of privileged code such as a platform's API method may be marked as being security critical and/or safe for being called by untrusted code. The set of code is evaluated to determine whether the code is security critical code, and if so, it is identified as security critical. Such code is further evaluated to determine whether the code is safe with respect to being called by untrusted code, and if so, is marked as safe. To determine whether the code is safe, a determination is made as to whether the first set of code leaks criticality, including by evaluating one or more code paths corresponding to one or more callers of the first set of code, and by evaluating one or more code paths corresponding to one or more callees of the first set of code.

14 Claims, 7 Drawing Sheets

USING SECURITY-RELATED ATTRIBUTES

BACKGROUND

In contemporary computing, computer application programs and other code may be downloaded and installed from the Internet. This leads to potential problems in that untrusted sources such as the Internet often provide code that is intentionally malicious or otherwise capable of harming or providing unauthorized access to important data. However, because there are many situations in which computer users benefit from the ability to download code and execute code without prompting, completely preventing downloading is not a practical solution to this problem.

One solution to this problem is referred to as sandboxing, a generic security term that applies to any environment that reduces the privileges under which an application runs. It is particularly valuable to sandbox applications downloaded from the Internet, as they tend to come from unknown or untrusted sources.

Some environments, such as one based on Microsoft Corporation's Windows® Presentation Foundation and .NET technologies, attempt to solve the problems of running untrusted code via a sandbox-model that limits what the untrusted code has permission to do. For example, the underlying platform can require that its callers have specific permissions, and while code can request the permissions it needs for the execution, the runtime will only grant permission based on policy that evaluates how much the code is trusted. Such permissions include things like the ability to access files and databases, connect to the Internet, interact with the user via a user interface, call into unmanaged code, and so forth. One policy-based solution is to prompt the user when code requests such permissions, however this solution is not very desirable because a typical user is often not equipped to make a correct security decision when prompted.

As can be readily appreciated, writing secure code for platforms that enable applications to be downloaded and installed from the Internet without prompting is an extremely difficult problem. This is because the platform itself needs to have elevated privileges to properly operate. Security flaws can exist if any part of the platform code is written such that it inadvertently exposes an internal way to run untrusted code with elevated permissions/privileges, (that is, allow the untrusted code to do something beyond what would otherwise be allowed via its reduced permission set), because this would allow the untrusted code to perform unsafe operations. By way of example, the platform code needs to be able to call unmanaged code for operating system services, such as to render text on a window, while untrusted code is not allowed to do so; however if the platform code is inadvertently written such that the untrusted code can call unmanaged code via a call to a internal method of the platform code, a security flaw exists.

One solution that increases the likelihood that platform code is securely written is to allow the developer to mark (e.g., using metadata) any part of the platform code that requires elevated permissions to run, or mark code that controls whether elevated permissions can be run. In general, the metadata indicates that the marked set of platform code is "critical" code that performs a dangerous operation. Security teams and static code analysis tools (e.g., FxCop is one such code analysis tool that checks .NET managed code assemblies) then recognize the metadata, whereby platform features can be developed so that the likelihood of platform code running with elevated privileges being exposed to untrusted code is dramatically reduced.

However, while highly valuable, the marking of such code and data as critical results in a complex code-review process that burdens a security team with many critical methods that need to be code reviewed.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a set of privileged code such as a platform's API method may be marked as being security critical and/or safe for being called by untrusted code; (which, for example may include code that the user has not explicitly trusted to run and have access to the user's machine, e.g., a random site on the internet that does not require a prompt. Trusted code comprises code that the user has explicitly, e.g., through a prompt for that specific application, or publisher, or the like, given permission to run/install on the machine). The set of code is evaluated to determine whether the code is security critical code, and if so, it is identified as security critical. Such code is further evaluated to determine whether the code is safe with respect to being called by untrusted code, and if so, is marked as safe. For example, method code may be considered safe when its inputs may be considered safe, when its returned values are not unsafe values (e.g., are non-critical data), and when the API is otherwise safe (e.g., does not perform operations known to be unsafe).

To determine whether the code is safe with respect to being called by untrusted code, a determination is made as to whether that code leaks criticality, including by evaluating one or more code paths corresponding to one or more callers of the first set of code, and by evaluating one or more code paths corresponding to one or more callees of the first set of code. For example, criticality may be leaked by passing or otherwise providing access to critical data to a callee of the method, when that callee in turn stores or leaks critical data, without safely brokering access to the critical data.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
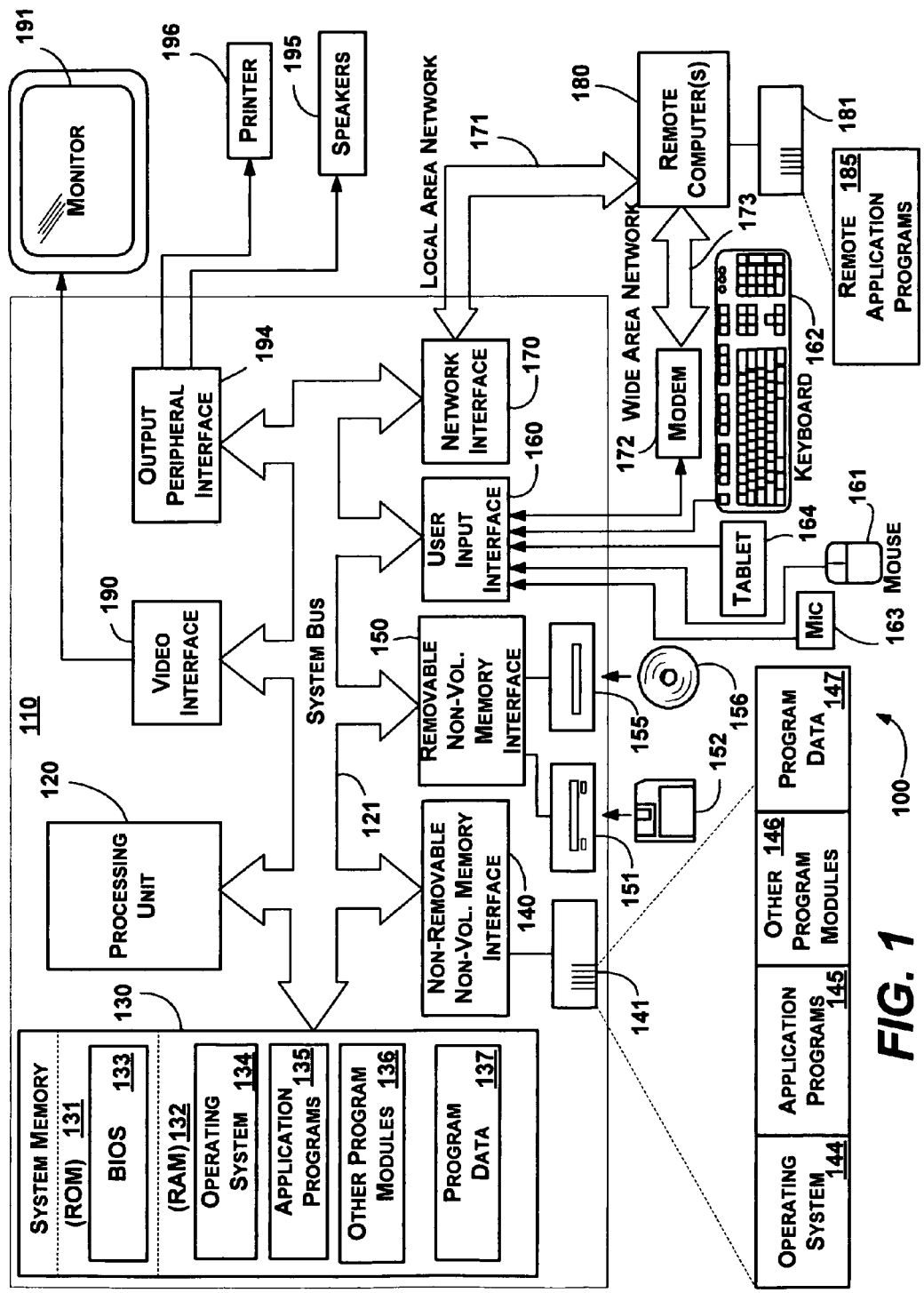
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It may be appreciated that the network connections shown are exemplary and other means of establishing a communications link between the computers may be used.

Using Security-Related Attributes

In general, a codebase such as platform code can be partitioned into a critical "core" that reduces the burden of security auditing, and increase the probability that a platform is secure. The technology described herein is generally directed towards a technology by which a set of code (e.g., a given method/API) and its code paths (e.g., other methods that call the set of code or other methods that the set of code calls) may be evaluated to determine whether the code is critical, and if so, whether the set of code can be treated as safe with respect to allowing its being called by untrusted code. For example, code corresponding to an application programming interface (API) may be deemed by an evaluation methodology (possibly using an analysis/auditing tool) to be transparent, whereby the code need not be heavily audited and can be called by an untrusted caller. In general, the only interfaces called by untrusted code are those marked public; however other code that is trusted but unaudited also may be called. Such unaudited code should be considered by developers as being untrusted, and thus as used herein, untrusted code also refers to unaudited code.

Alternatively, a method is deemed critical when it elevates (privileges) and/or performs certain operations such as those that return, store or provide access to critical data, in which event the code may be tagged (with metadata) as needing to be heavily audited. A method is also deemed critical at times when it makes decisions about a behavioral difference from a security standpoint. In general, the metadata indicates that the marked set of platform code is "critical" code that performs a dangerous operation or calls into something that performs a dangerous operation and is not marked TreatAsSafe.

This is done to ensure that any changes to this code are also audited. Although critical, there is still a possibility that such a method may be treated as safe, including safe for being called by an untrusted caller, if the method does not have unsafe (or validates) inputs (e.g., dealing with critical parameters), does not work with unsafe values (e.g., return or store critical data), and is otherwise safe. In other words, a critical method may be safe in the event that its criticality does not "leak out or up" to transparent code and/or untrusted callers. One way criticality can be leaked is by providing access to data that required an elevation of permissions to obtain.

In general, the technology described herein is primarily described with reference to an example Windows® Presentation Foundation managed code environment, including code access security, a .NET framework, and a common language runtime that provide a secure execution environment for untrusted or partially trusted code, (such as Web Browser Applications, e.g., having a .xbap extension). This technology also extends to XPSDocuments and .XAML files. As will be understood, however, such technology may be implemented in other sandbox-type environments, and thus may be used various ways that provide benefits and advantages in computing in general.

Figure 2:
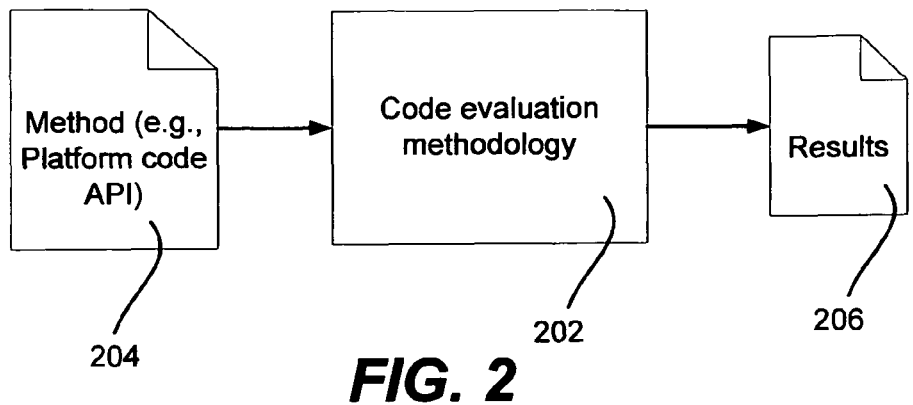
FIG. 2 is a block diagram representing a code evaluation methodology analyzing platform code to provide security-related results.

FIG. 2 shows an example code evaluation methodology 202 (e.g., a manual analysis and/or a software-based analysis tool or tools) evaluating some method 204 such as an API of the platform code to ensure that any critical code is marked as such, and also to mark code as to whether it may be treated as safe for being called by untrusted code. The results 206 may be reviewed by a security team and/or one or more developers (possibly using further analysis tools) to eliminate any security flaws in the method 204. In a typical scenario, the initial safe/unsafe categorization is done by a combination of tools, developer review, and is based upon a set of guidelines.

Figure 3:
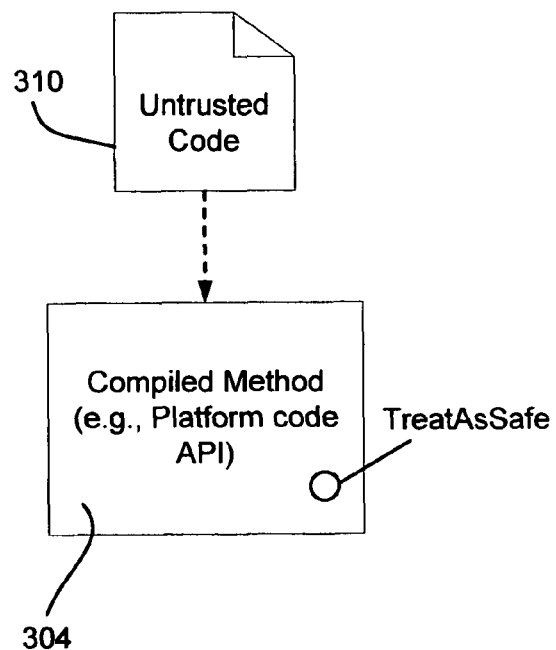
FIG. 3 is a block diagram representing untrusted code that may call a method (e.g., API) of compiled platform code when the method has been deemed safe via code analysis.

FIG. 3 shows the compiled method 304 in operation with untrusted code 310. Whether or not the method can be called by the untrusted code 310 (as indicated by the dashed line) depends on what the method 304 does, as evaluated in the previous analysis of FIG. 2. In the event the method 304 is not safe, the untrusted code 310 will not be able to use the functionality of the method 304, that is, a sandbox is set up that prevents its usage. Note that it is feasible to perform runtime checks for untrusted or transparent code calling critical, non-marked as safe methods, e.g., by maintaining attributes or the like with the compiled method code 304 that indicates when code, data and/or methods are critical. In general, code is critical when it performs an operation that is an elevation, calls a critical method, and/or stores data obtained under an elevation. Note that a platform may be built on top of an existing platform, which needs to be evaluated when determining the initial criticality of an operation.

As mentioned above, it is possible that critical code may be called by untrusted code as long as the critical code has certain characteristics by which the critical code may be deemed safe. Among these characteristics is that the overall functionality of the critical code is itself safe. Another characteristic is that any caller (untrusted or otherwise) can safely call the critical method, e.g., so that the called method's criticality cannot leak out to such callers. Still another characteristic is that the critical code does not call any other code (any "callee") to which the calling code passes critical data and to which it in turn leaks out that data to untrusted/non-critical callers. If these characteristics are not present, the method cannot be deemed safe.

Figure 4:
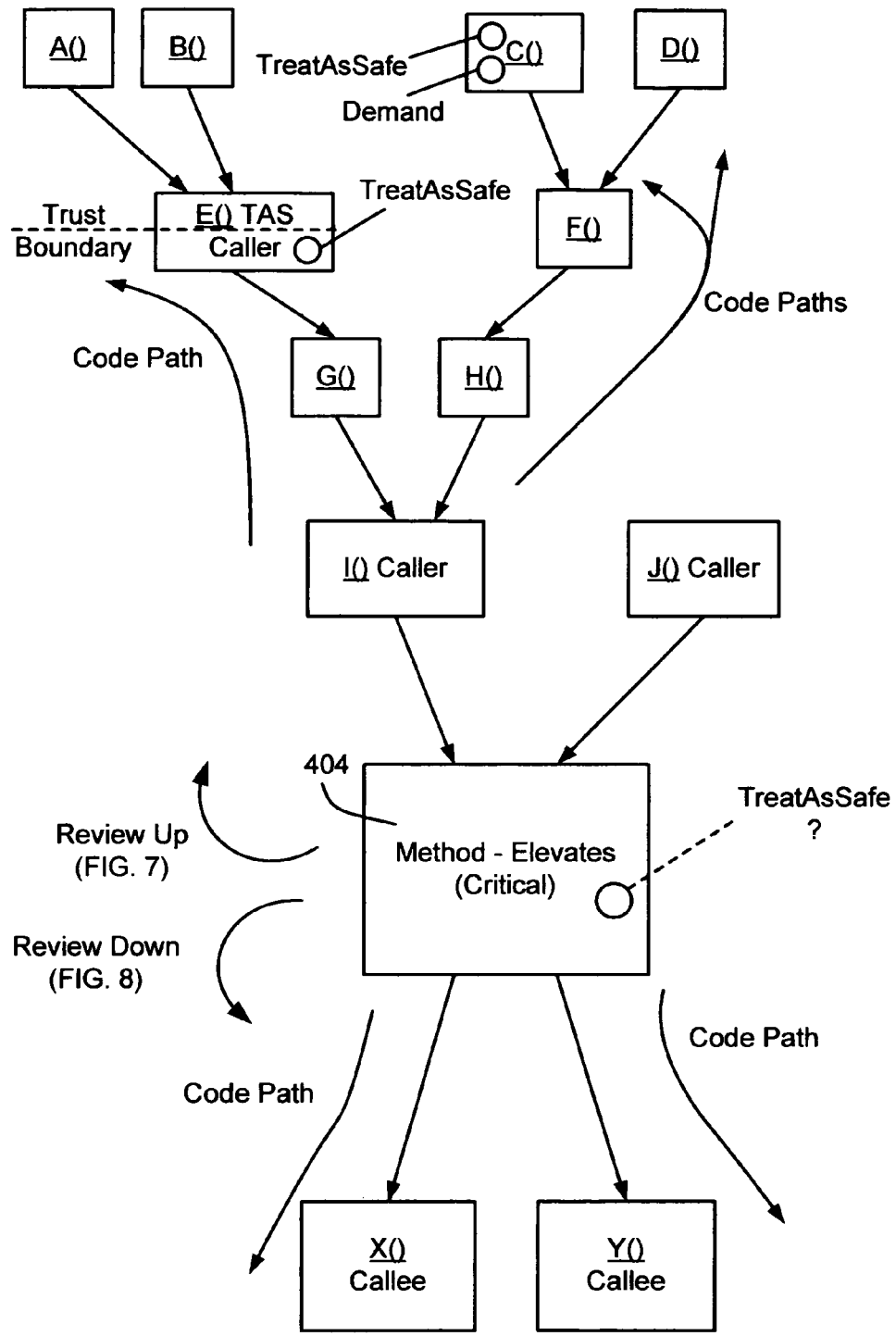
FIG. 4 is a representation of a critical method that is evaluated for whether it can be treated as safe for being called by unknown code based on its own code, other code (callers) that may call the method, and other code (callees) that the method may call.

FIG. 4 provides a visual representation of these characteristics, where some method 404 that is critical (elevates) is evaluated for whether it can be tagged as safe (e.g., with a TreatAsSafe security attribute). For example, the method 404 may be critical when an operation is performed that is outside the set of things allowed in the predefined sandbox, e.g., a call to unmanaged code on a CAS platform (where in a CAS, or Code Access Security model, a program runs with full trust (a full set of rights and privileges) or with partial trust (some lesser subset of rights and privileges).

Other methods that are represented in FIG. 4 include callers A()-J() that form code paths that need to be reviewed, including direct callers I() and J(), that may need to be evaluated to determine whether any one of them causes a criticality violation that would prevent the method 404 from being marked as safe, and callees X() and Y() that also need to be evaluated along with any code paths to which they belong.

In general and as described below, the method 404 has its own code evaluated for criticality and for whether it can be treated as safe for being called by untrusted callers. If so, then the method 404 may be marked as safe (e.g., tagged with a TreatAsSafe attribute). To determine this, the code path(s) of the method 404 are reviewed, e.g., those of callers I() and J(). This is generally referred to as reviewing up, where the upward direction is arbitrarily defined as in FIG. 4 such that callers are "above" callees; reviewing up determines the criticality of the callers and helps determine a new treat as safe boundary if the current method cannot be one. Similarly, the downward code path(s) to the callees of the method 404 are reviewed; reviewing down determines the criticality of the callees to ensure that no critical data is leaked out.

While evaluating its callers and callees, if a trust boundary is reached in that a caller or callee is already marked as TreatAsSafe, then that code path is considered safe and need not be evaluated further. For example, in FIG. 4, the E() method is marked TreatAsSafe (TAS), and thus a trust boundary is reached on this path, whereby methods A() and B() (and any other higher methods that call them) need not be evaluated, as that particular code path is known safe. Note that some methods that are marked TreatAsSafe are because they will throw a security exception if the appropriate permissions are not available. This is also a viable TreatAsSafeBoundary.

In addition, the code developer may mark a certain function/method as specifically not being enabled in a sandbox environment, e.g., via a demand attribute or a link demand or an explicit demand in the code, as represented in FIG. 4 by the method C(). In such a situation, there is no reason to evaluate that path since this calling path will otherwise not be allowed, and thus its callers need not be evaluated. This function can essentially be considered treat as safe from the perspective of the method 404.

Figure 5A:
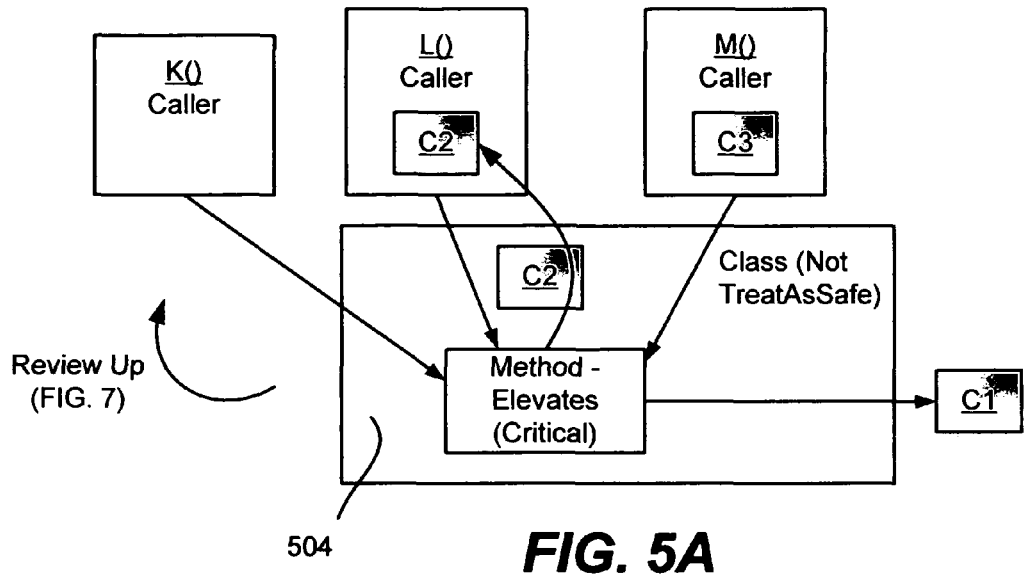
FIGS. 5A and 5B comprise representations of a critical method that is deemed unsafe for being called by unknown code based on leaking its criticality to other callers or callees.

FIG. 5A shows an example of a method 504 that cannot be marked treat as safe, because it stores (e.g., in some variable) critical data, shown as the shaded box marked C1, and/or has at least one caller to which it leaks critical data C2. Note that other ways of leaking criticality are feasible, but are not represented in FIG. 5A.

Figure 5B:
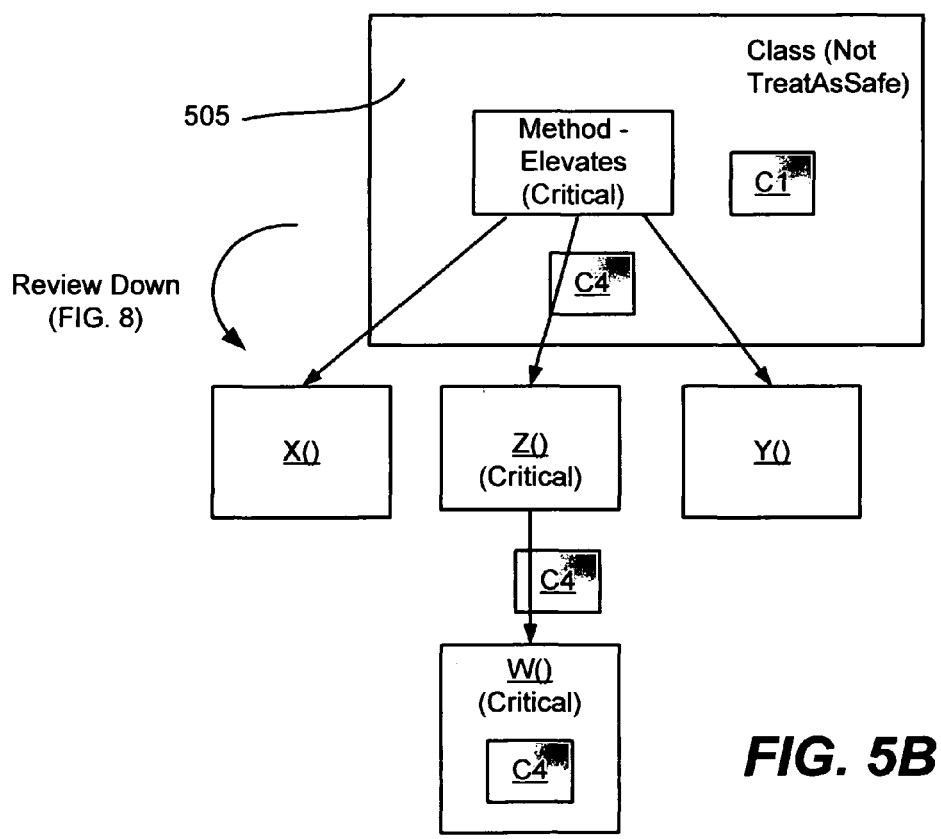

FIG. 5B shows another example method 505 that cannot be treated as safe because it passes critical data C4 to a callee Z() that leaks the data to an unsafe method W(), (wherein W() stores critical data in such a way that it is leaked to untrusted code). Note that other ways of leaking criticality are feasible, but are not represented in FIG. 5B.

Figure 6:
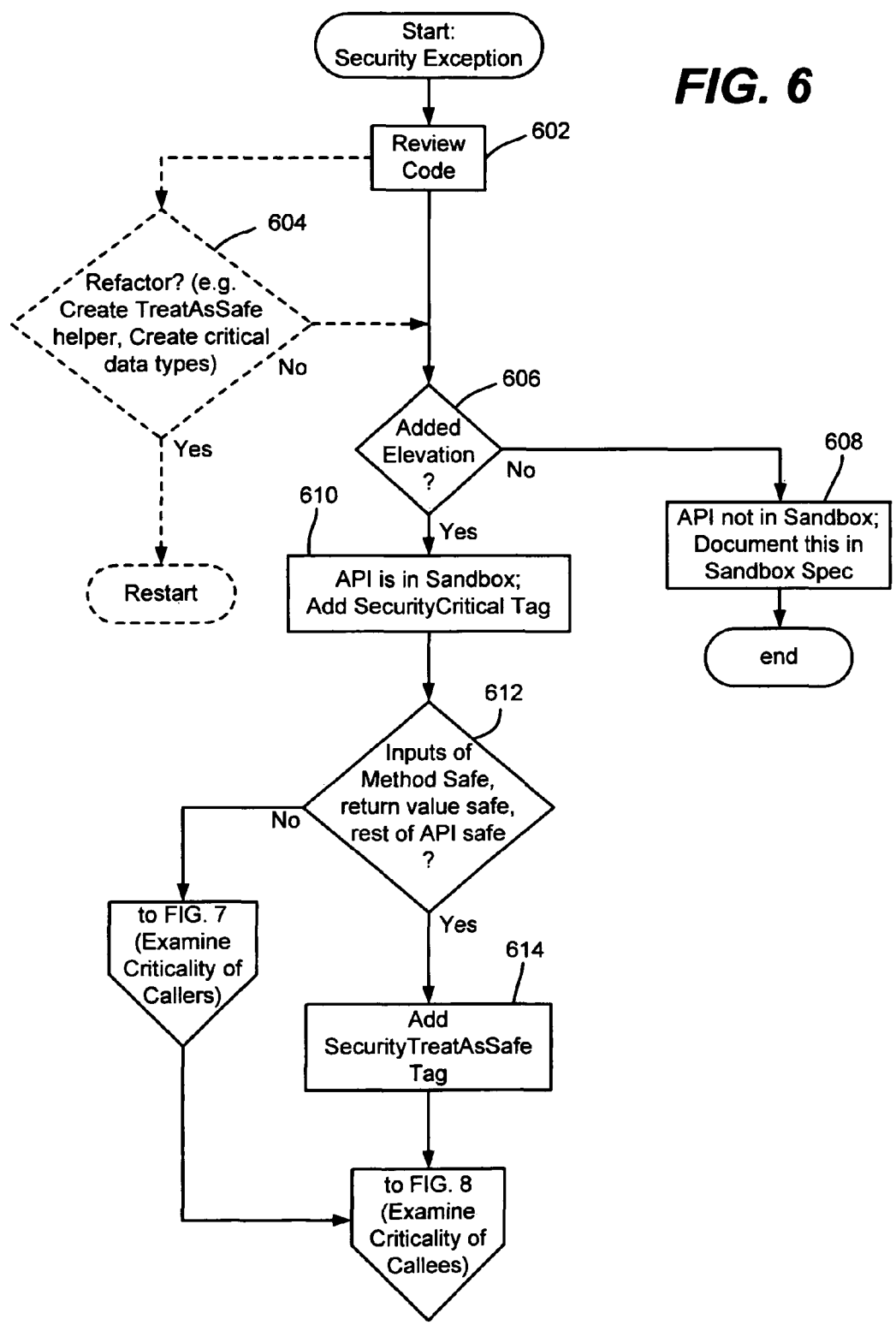
FIG. 6 is a flow diagram representing reviewing a set of code (e.g., a method) to determine whether that code is critical, and if so, whether it can be treated as safe for being called by untrusted code.

Turning to an explanation of the operation of such technology in one example implementation, FIG. 6 shows the reviewing of code following the initial security exception that that is thrown when some code attempts to do something that it does not have the required permission to do. For example, in a Windows® Presentation Foundation environment, when such a situation occurs, the demand fails and the .NET Framework runtime throws a SecurityException.

To locate such potential security flaws, a developer of a platform method may intentionally request some action be taken through the method that a requesting (sandboxed) program does not have permission to do, such as to write something to the file system, and thus cause a security exception. In general, this will start the analysis logic of FIG. 6. Note that in addition to attempted file system reads or writes by some code, other examples of actions that will cause a security exception may include attempted reads or writes to a system registry, or attempts to call native operating system (e.g., Win32) functions.

Step 602 of FIG. 6 represents reviewing the method, including reviewing it to determine (as represented via step 606) whether the code corresponds to an added elevation. Note that step 604 represents determining via a helper class whether the piece of code being evaluated may be refactored into smaller pieces, (e.g., functions), such as to break dangerous operations into smaller isolated functions, and determine whether those functions are able to contain the criticality and return safe data, whereby those smaller pieces may be marked treat as safe. However, for purposes of this example, this step 604 may be considered optional or already performed with respect to the code being evaluated.

In the event that there is no elevation being performed, step 606 branches to step 608 where the method (API in this example) can be considered not part of this sandbox. This situation may be documented, e.g., in a sandbox specification.

If the method elevates, step 606 branches to step 610 where the API is considered part of the sandbox, and is marked with a security critical (e.g., SecurityCritical attribute) tag at step 610. The method is then further evaluated to determine whether it is safe, that is, whether it contains its criticality (is safe) or leaks any of its criticality (is not safe) to other methods.

Step 612 evaluates the method, including whether its inputs (e.g., params, class fields, and so forth) may be considered safe, whether its returned values are non-critical, and whether the API is otherwise safe. If so, step 612 branches to step 614, where the method is marked as safe, e.g., via a TreatAsSafe tag. Note that the evaluation process may continue to evaluate its callees, as represented via FIG. 8.

Figure 7:
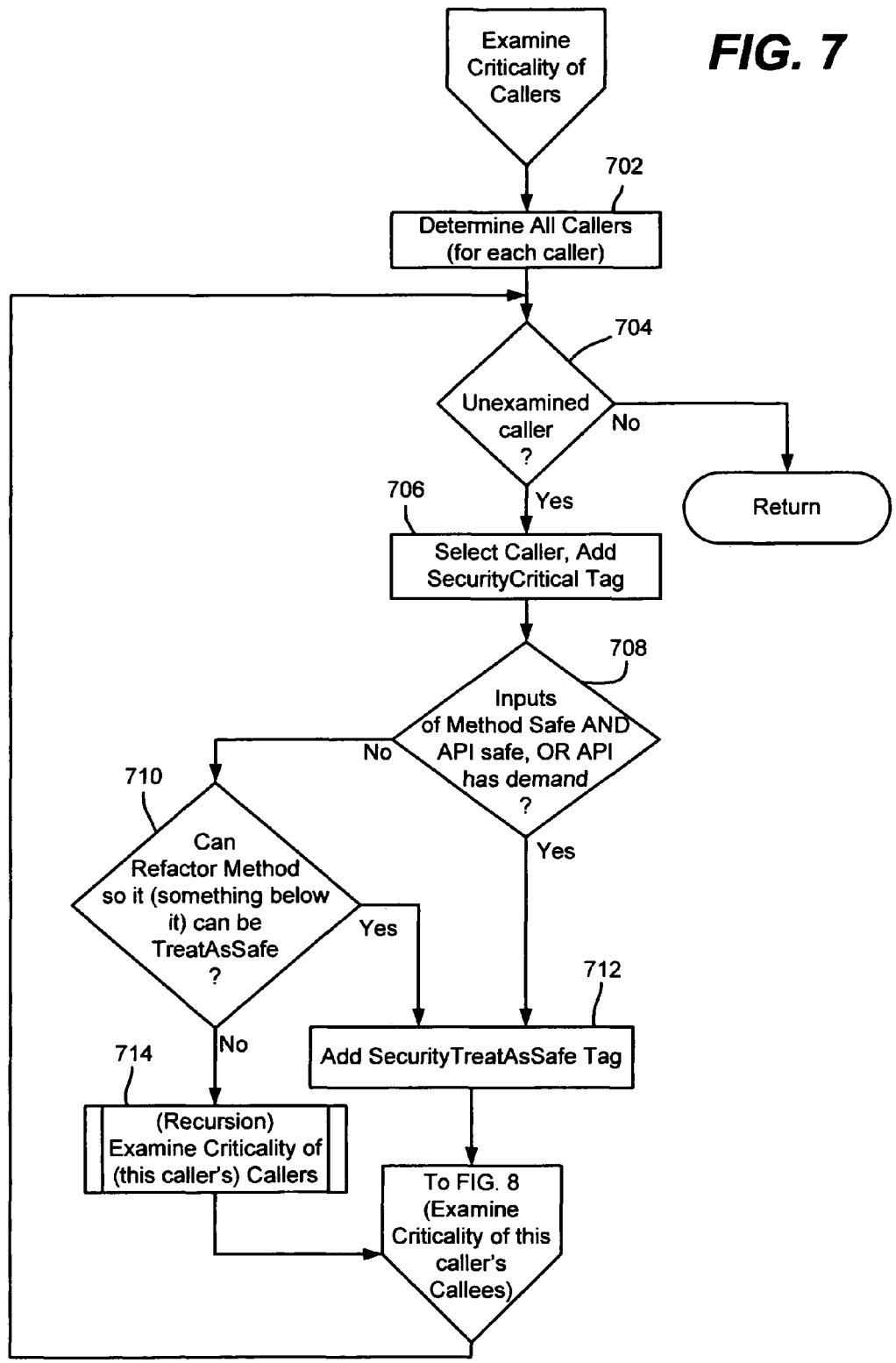
FIG. 7 is a flow diagram representing reviewing the callers of a method to determine whether the method leaks criticality to the callers.

If not safe at FIG. 612 because it may leak its criticality, the process branches to step 702 of FIG. 7 to evaluate the criticality of this method's callers. Essentially this branch corresponds to the "reviewing up" part of the evaluation, wherein each upward code path (the method's callers and any caller's callers and so forth) may be exploded into it various callers, with each caller recursively evaluated for safety.

Figure 8:
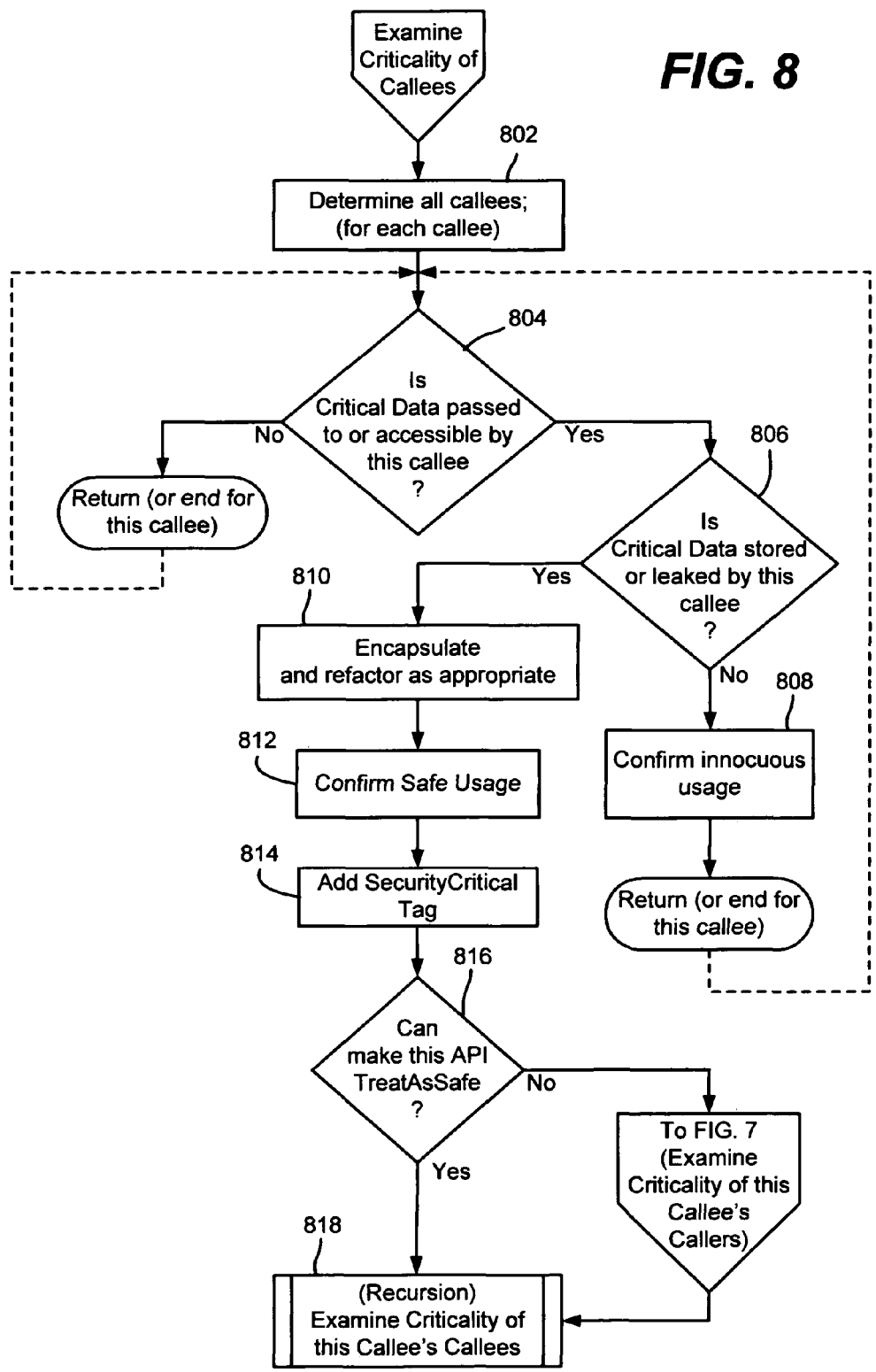
FIG. 8 is a flow diagram representing reviewing the callees of a method to determine whether the method leaks criticality to the callees.

FIG. 7 represents the reviewing up process of the callers' code paths, in which each method in the code path is evaluated as to whether it is safe or leaks criticality. FIG. 8 represents the reviewing down process of the callees' code paths, in which each method in the code path is evaluated as to whether it is safe or leaks criticality. Note that there is no particular order for selecting a caller or callee to evaluate, as long as each is evaluated. Also, FIGS. 7 and 8 show only general example steps, and as mentioned above additional steps may exist for efficiency, e.g., a developer may put a demand on a method that ends the need to evaluate further in a given code path if that method is not going to be enabled for a sandbox, and a method already marked treat as safe need not be further exploded into its code paths.

In general, step 702 represents determining each of the primary method-under-test (API's) direct callers, with step 704 representing the test that ends this reviewing up process when all callers have been examined. Step 706 selects an unexamined caller as a currently selected caller, and adds the security critical tag to the currently selected caller, (as this caller is calling a security critical method (as previously determined at step 606 of FIG. 6).

Steps 708, 710, 712 and 714 perform an analysis on the caller similar to that described with reference to FIG. 6, and indeed can recursively reuse at least part of the evaluation process described with reference to FIG. 6. Note that step 714 recursively reuses the code of FIG. 7 so that each of the currently selected caller's callers are likewise examined. In this manner, each code path is evaluated in a reviewing up process, that is, each caller and its callers are examined and tagged as appropriate (unless a code path is stopped via a caller having a demand or treat as safe tag already present). In the event that the callers can not be marked as treat as safe, the API is not available in this sandbox.

FIG. 8 represents the reviewing down process of the callees, whether that callee is called by the API under test, by a direct or indirect caller of that API, or by another callee. Again, a general purpose of FIG. 8 is to determine whether criticality is leaked to any callee, to any caller of each callee, or to any callee of that callee. More particularly, this part of the process examines whether any critical data passed to a currently-selected callee is stored, e.g., in a variable, or leaked, that is passed to another method or methods.

To this end, FIG. 8 evaluates for each callee (step 802) whether that callee receives or accesses critical data (step 804), and if so, whether the critical data is stored or leaked by the callee (step 806). Note that critical data is tagged as such by the developer, and thus is readily identifiable. In the event that the critical data is not stored or leaked, step 808 is performed to confirm that this callee's usage of the critical data is indeed innocuous, which may include identifying the callee code for further audit.

Returning to step 806, if the critical data is stored or leaked, step 810 is instead executed, which represents encapsulating the data (e.g., in a security critical data container as described in U.S. patent application Ser. No. 11/051,808, filed Feb. 4, 2005, assigned to the assignee of the present invention and hereby incorporated by reference), and refactoring. Step 812 represents confirming safe usage, e.g., via an audit, and step 814 adds a security critical tag to this current callee being evaluated.

Step 816 evaluates the API may be marked with the TreatAsSafe tag, and if not, the process explodes this callee's callers and evaluates them using the process described above with respect to FIG. 7. In any event, this callee's callees are also evaluated, e.g., recursively via the code of FIG. 8, as represented via step 818.

In this manner, a decision process as to when to mark a set of code (e.g., a method) as SecurityCritical and/or SecurityTreatAsSafe is realized. The process thus helps in developing secure code, including by identifying potential or actual security flaws.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method for determining whether code is safe to be called by an untrusted program, the method comprising:
   accessing a set of code stored in at least one computer-readable medium of a computing system having a processor communicatively coupled to the at least one computer-readable medium;
   evaluating a plurality of code paths corresponding to one or more callers of the set of code, wherein evaluating the one or more callers of the set of code comprises:
   identifying direct callers of the set of code;
   evaluating all direct callers of the set of code and determining whether the set of code leaks critical data to such direct callers;
   after identifying direct callers of the set of code, recursively identifying all indirect callers of the set of code by using the set of code, wherein indirect callers are identified as being distinguished from direct callers and includes any callers that: (a) call direct callers; or (b) call other indirect callers;
   evaluating indirect callers of the set of code and determining whether the set of code leaks critical data to such indirect callers; and
   determining that at least one direct caller or indirect caller is marked with a TreatAsSafe or Demand attribute and, in response, abstaining from further recursive evaluation of indirect callers above such at least one direct caller or indirect caller; and
   evaluating at least one code path corresponding to one or more callees of the set of code, wherein evaluating the at least one code path corresponding to the one or more callees of the set of code includes determining whether the set of code leaks critical data to the one or more callees of the set of code.

2. The method of claim 1, further comprising:
   adding metadata that indicates that the set of code is safe to be called by untrusted code only when it is determined that none of the direct callers, indirect callers, and callees of the set of code are leaked critical data.

3. The method of claim 2, wherein adding metadata comprises tagging the set of code with a TreatAsSafe attribute.

4. The method of claim 1, further comprising:
   adding metadata that indicates that the set of data is security critical and unsafe to be called by untrusted code.

5. The method of claim 4, wherein the metadata is added after determining that one or more of the direct callers, indirect callers, or indirect callees is passed critical data.

6. The method of claim 1, wherein evaluating a plurality of code paths comprises determining whether a direct or indirect caller in a code path corresponding to a caller of the set of code has unsafe inputs.

7. The method of claim 1, wherein evaluating a plurality of code paths comprises determining whether a direct or indirect caller in a code path corresponding to a caller of the code performs an unsafe operation.

8. The method of claim 1, wherein evaluating a plurality of code paths comprises determining whether a callee of the set of code stores critical data corresponding to the set of code.

9. The method of claim 1, wherein evaluating the plurality of code paths to one or more callers further comprises:
determining whether the set of code elevates.

10. The method of claim 1, further comprising auditing the set of code, wherein auditing the set of code comprises determining whether the set of code itself returns unsafe data.

11. One or more computer storage devices having stored thereon computer-executable instructions that, when executed by a processor of a computing system, perform a method for determining whether code is safe to be called by an untrusted program, the method comprising:
accessing a set of code of the computing system;
evaluating a plurality of code paths corresponding to one or more callers of the set of code, wherein evaluating the one or more callers of the set of code comprises:
identifying all direct callers of the set of code;
evaluating all direct callers of the set of code and determining whether the set of code leaks critical data to such direct callers;
after identifying all direct callers of the set of code, recursively identifying all indirect callers of the set of code by using the set of code, wherein indirect callers are identified as being distinguished from direct callers and includes any callers that: (a) call direct callers; or (b) call other indirect callers;
evaluating indirect callers of the set of code and determining whether the set of code leaks critical data to such indirect callers; and
determining that at least one direct caller or indirect caller is marked with a TreatAsSafe or Demand attribute and, in response, abstaining from further recursive evaluation of indirect callers above such at least one direct caller or indirect caller; and
evaluating at least one code path corresponding to one or more callees of the set of code, wherein evaluating the at least one code path corresponding to the one or more callees of the set of code includes determining whether the set of code leaks critical data to the one or more callees of the set of code.

12. A method for determining whether code is safe to be called by an untrusted program, the method comprising:
at a computing system that includes a processor communicatively coupled to computer-readable media having thereon a set of code and an untrusted program that has been sandboxed to limit its ability to request actions with respect to the set of code:
intentionally requesting an action be taken on the set of code that the sandboxed, untrusted program does not have permission to request;
throwing a security exception upon determining that the untrusted program does not have permission to request the action;
after throwing the security exception, reviewing the set of code to determine whether the set of code corresponds to an added elevation, wherein reviewing the set of code comprises:
using a helper class and refactoring the set of code into smaller functions, including breaking dangerous operations into smaller, isolated functions;
determining whether the smaller functions are able to contain criticality and avoid leaking critical data; and
marking smaller functions that are able to contain criticality and avoid leaking critical data as safe;
considering an application programming interface (API) as part of the sandbox and marking the API with a security critical tag; and
evaluating the set of code to determine whether the set of code is safe by determining whether it leaks any of its criticality, wherein evaluating the set of code comprises:
determining whether parameters and class field inputs are considered safe;
determining whether returned values are non-critical;
marking the set of code as safe only when inputs are considered safe and returned values are non-critical;
when parameters or class field inputs are not considered safe, or when returned values are critical, evaluating callers of the set of code, which comprises:
recursively determining all callers, wherein all callers include all direct callers and all callers of other callers, of the set of code;
upon accessing a caller that is yet unexamined, adding a security critical tag to such caller;
determining whether parameters and class field inputs are considered safe for each caller;
determining whether returned values are non-critical for each caller;
stopping evaluation of any code path once a demand or TreatAsSafe tag is encountered; and
marking the set of code as safe only when inputs are considered safe and returned values are non-critical, or when a demand or TreatAsSafe tag is encountered.

13. The method of claim 12, further comprising:
evaluating all callees of the set of code, which comprises:
recursively determining all callees, including all callees of other callees of the set of code;
for each callee:
determining whether critical data is passed to the callee;
only when the callee receives critical data, determining whether critical data is stored or leaked by the callee and, when the callee does not leak or store critical data, identifying use by the callee of the critical data as innocuous; and
when the callee does receive critical data and does leak or store critical data, adding a security critical tag to the API.

14. The method of claim 13, further comprising:
after adding a security critical tag to the API, determining whether the API can be made safe; and
when the API can be made safe, evaluating all callers of the callee for criticality.

* * * * *